(12) United States Patent
Wokrinek et al.

(10) Patent No.: US 10,987,999 B2
(45) Date of Patent: Apr. 27, 2021

(54) CONTROLLABLE AIR OUTLET NOZZLE

(71) Applicant: Bayerische Motoren Werke Aktiengesellschaft, Munich (DE)

(72) Inventors: Michael Wokrinek, Bruckberg (DE); Jens Ceribasic, Munich (DE); Ismar Colic, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 260 days.

(21) Appl. No.: 15/493,276

(22) Filed: Apr. 21, 2017

(65) Prior Publication Data
US 2017/0217289 A1 Aug. 3, 2017

Related U.S. Application Data

(63) Continuation of application No. PCT/EP2015/073965, filed on Oct. 16, 2015.

(30) Foreign Application Priority Data

Oct. 23, 2014 (DE) ..................... 10 2014 221 580.3

(51) Int. Cl.
  *B60H 1/34* (2006.01)
(52) U.S. Cl.
  CPC ........... *B60H 1/3414* (2013.01); *B60H 1/345* (2013.01); *B60H 1/3457* (2013.01)
(58) Field of Classification Search
  CPC ...... B60H 1/3414; B60H 1/3457; B60H 1/34; B60H 1/345
  (Continued)

(56) References Cited

U.S. PATENT DOCUMENTS 5,238,220 A * 8/1993 Shell ........................ F16K 1/221
  251/67
5,340,358 A * 8/1994 Halupczok ............ F24F 13/062
  454/299
(Continued)

FOREIGN PATENT DOCUMENTS

CN 1919629 A 2/2007
DE 699 01 356 T2 1/2003
(Continued)

OTHER PUBLICATIONS

DE102009039466 A1 to Arndt English translation (Year: 2009).*
(Continued)

*Primary Examiner* — Steven B McAllister
*Assistant Examiner* — Allen R Schult
(74) *Attorney, Agent, or Firm* — Crowell & Moring LLP

(57) ABSTRACT

An air outlet nozzle, in particular for a motor vehicle, includes: a tube-shaped nozzle body; a first air guide element which is arranged in the tube-shaped nozzle body, and which is in contact with the tube-shaped nozzle body and forms a screw shape; a second air guide element which is arranged in the tube-shaped nozzle body, and which is in contact with the tube-shaped nozzle body and forms a screw shape. The first air guide element and the second air guide element are offset from one another in the tube-shape nozzle body, such that a first airway and a second airway are formed in the tube-shaped nozzle body. A moving adjustment element closes the first airway in a first position, and releases the first airway in a second position.

11 Claims, 5 Drawing Sheets

(58) Field of Classification Search
USPC .......................................................... 454/155
See application file for complete search history.

(56) References Cited

U.S. PATENT DOCUMENTS

| | | | |
|---|---|---|---|
| 6,342,003 B1 | 1/2002 | Wang | |
| 8,038,516 B2* | 10/2011 | Klingler | B60H 1/3457 454/145 |
| 2006/0068694 A1* | 3/2006 | Tajiri | B60H 1/00685 454/152 |
| 2006/0135054 A1* | 6/2006 | Burr | B60H 1/345 454/155 |
| 2007/0066206 A1 | 3/2007 | Ono et al. | |
| 2007/0111652 A1 | 5/2007 | Klingler et al. | |
| 2008/0105754 A1* | 5/2008 | Baruschke | B60H 1/00735 236/91 F |
| 2008/0233857 A1* | 9/2008 | Kuhnel | B60H 1/345 454/152 |
| 2009/0298406 A1* | 12/2009 | Norbury, Jr. | B60H 1/34 454/69 |

FOREIGN PATENT DOCUMENTS

| | | | |
|---|---|---|---|
| DE | 10 2004 038 016 A1 | 7/2005 | |
| DE | 10 2005 054 295 A1 | 5/2007 | |
| DE | 202008016461 U1 * | 3/2009 | ........... B60H 1/3457 |
| DE | 20 2008 016 461 U1 | 4/2009 | |
| DE | 10 2009 039 466 A1 | 3/2011 | |
| DE | 10 2009 050 377 A1 | 4/2011 | |
| DE | 10 2011 086 229 A1 | 5/2013 | |
| EP | 1 785 298 A1 | 5/2007 | |
| EP | 1 953 017 A2 | 8/2008 | |
| WO | WO 2005/016673 A1 | 2/2005 | |

OTHER PUBLICATIONS

Chinese-language Office Action issued in counterpart Chinese Application No. 201580057224.9 dated Oct. 24, 2018 with English translation (15 pages).

German Search Report issued in counterpart German Application DE 10 2014 221 580.3 dated Apr. 20, 2015 with partial English translation (fifteen (15) pages).

International Search Report (PCT/ISA/210) issued in PCT Application No. PCT/EP2015/073965 dated Jan. 25, 2016 with English translation (eight (8) pages).

German-language Written Opinion (PCT/ISA/237) issued in PCT Application No. PCT/EP2015/073965 dated Jan. 25, 2016 (five (5) pages).

* cited by examiner

CONTROLLABLE AIR OUTLET NOZZLE

CROSS REFERENCE TO RELATED APPLICATIONS

This application is a continuation of PCT International Application No. PCT/EP2015/073965, filed Oct. 16, 2015, which claims priority under 35 U.S.C. §119 from German Patent Application No. 10 2014 221 580.3, filed Oct. 23, 2014, the entire disclosures of which are herein expressly incorporated by reference.

BACKGROUND AND SUMMARY OF THE INVENTION

The invention relates to an air outlet nozzle, in particular for a motor vehicle.

In order to provide air-conditioning in a vehicle, fresh-air vents are used. Here, the direction of the air stream is varied by vertical and horizontal slats of the vent grill.

On account of short slats, the air stream is not deflected optimally into the intended set direction. Lengthening the horizontal slat has a negative effect on the vertical deflection of the air stream, and conversely, lengthening the vertical slat would negatively affect the horizontal air stream. The reason for this is the arrangement of the slat assemblies one behind the other.

Accordingly, the object of the invention is to create an air outlet nozzle with improved control of the air stream.

According to the invention, this and other objects are achieved by an air outlet nozzle, in particular for a motor vehicle, comprising a tubular nozzle body; a first air guiding element arranged in the tubular nozzle body, said first air guiding element being in contact with the tubular nozzle body and forming a screw shape; a second air guiding element arranged in the tubular nozzle body, said second air guiding element being in contact with the tubular nozzle body and forming a screw shape, wherein the first air guiding element and the second air guiding element are arranged in the tubular nozzle body in a manner offset from one another, such that a first air path and a second air path are formed in the tubular nozzle body; and a movable setting element which closes the first air path in a first position and opens the first air path in a second position.

As a result of the screw shape of the air guiding elements, a swirl and thus a stable direction are imparted on the air stream. Since, in the first position of the movable setting element, the first air path is closed, all of the air can only emerge through the second air path in a swirling manner, resulting in a more targeted and sharper air stream spot. In the second position of the movable control element, the air can emerge through both air paths at the same time, resulting in a diffuse and less sharp flow. Furthermore, upon entering the air outlet nozzle, the air stream can be in contact with both air paths, wherein, in the first position of the movable control element, only air from the second air path can then emerge.

In this case, the air outlet nozzle according to the invention can have both symmetrical and asymmetrical screw shapes for the first and the second air guiding element. Furthermore, the air guiding elements can be configured such that the volumes in the first and in the second air path differ from one another. For example, the air stream is more diffuse in the second position of the movable setting element, the greater the volume of the first air path is compared with the second air path. Accordingly, the air stream is sharper in the first position of the movable setting element, the greater the volume of the first air path is compared with the second air path.

According to one embodiment, the air outlet nozzle also has a connecting element which is arranged upstream of the movable setting element in the direction of air flow between the first air guiding element and the second air guiding element in the first air path, such that it closes the first air path. In this case, the movable setting element closes an opening in the first air guiding element in the first position and opens it in the second position, such that the first air path and the second air path are connected to one another. As a result, in the second position of the movable setting element, air can easily flow from the second air path into the first air path through the opening in the first air guiding element, wherein the first air path is thus opened. The connecting element thus allows further advantageous configurations of the air outlet nozzle according to the invention.

The connecting element can be configured as a partition wall between the first air guiding element and the second air guiding element, and thus allow easier production of the air outlet nozzle according to the invention.

In a preferred embodiment, the connecting element is configured as a common origin surface with a branching point, from which the two air guiding elements branch in the direction of air flow. This results in a particularly advantageous guidance of the air stream through both screw-shaped air guiding elements.

According to a further advantageous embodiment, the tubular nozzle body has, at its air outlet opening, a ring to which slats for deflecting the air stream at a previously determined deflection angle are attached. As a result, the air stream can be directed even better to the desired points. In particular, depending on the type of vehicle, different deflection angles can be set. In general, the ring with the slats forms a fresh air grill, wherein the slats can be designed optimally for the desired flow.

For particularly precise control of the air stream, the slats arranged in the first air path can be at a deflection angle which is different than the deflection angle of the slats arranged in the second air path, and/or the slats arranged in the first air path can have a slat length which is different than the slat length of the slats arranged in the second air path. In general, it is thus possible for the slats to be designed optimally for the desired flow.

According to a further embodiment, the ring is connected to the tubular nozzle body. When the movable setting element is in its first position and the air stream emerges from the air outlet nozzle according to the invention as a spot, any deflection through 360° about the previously determined deflection angle of the slats of the air outlet nozzle is allowed by the rotation of the ring, since the entire tubular nozzle body can rotate. In this case, the tubular nozzle body only needs to be constructed in a rotatable manner.

According to a further embodiment, the ring is connected to the first air guiding element and to the second air guiding element, and the ring, the first air guiding element and the second air guiding element are mounted in a rotatable manner with regard to the tubular nozzle body. When the movable setting element is in its first position and the air stream emerges from the air outlet nozzle according to the invention as a spot, any deflection through 360° about the previously determined deflection angle of the slats of the air outlet nozzle is allowed by the rotation of the ring, since then only the ring, the first air guiding element and the second air guiding element can rotate. In this case, the tubular nozzle body can be constructed in a fixed manner.

In a particularly preferred embodiment, the air outlet nozzle according to the invention comprises a closure element arranged at the air inlet opening of the tubular nozzle body. The closure element closes both air paths in a first position and opens both air paths in a second position. As a result, the entire air stream of the air outlet nozzle can easily be stopped.

According to a further embodiment, the air outlet nozzle according to the invention comprises a longitudinal shaft which is arranged in the tubular nozzle body and to which the first air guiding element and the second air guiding element are attached. The longitudinal shaft has a movable control element, wherein, in a first position of the control element, the setting element is in its first position for closing the first air path, and in a second position of the control element, the setting element is in its second position for opening the first air path. The longitudinal shaft thus serves as a space for the control element which controls the movable setting element.

Preferably, in the first and second positions of the control element, the closure element is in its second position for opening both air paths, and in a third position of the control element, the closure element is in its first position for closing both air paths. As a result, the control element can control both the movable setting element and the closure element.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
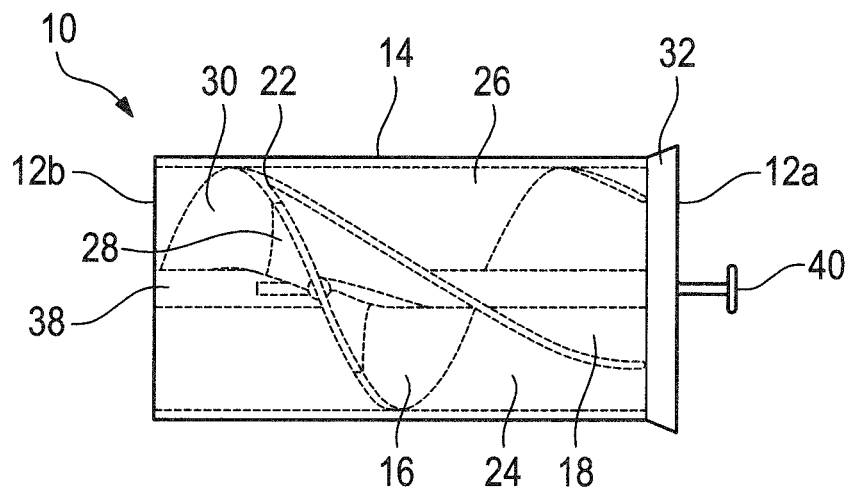
FIGS. 1A-1C show an exemplary embodiment of the air outlet nozzle according to the invention in a side view and in a front view, wherein the first air path is closed.

FIG. 1A shows an exemplary embodiment of an air outlet nozzle 10 according to the invention. Arranged in an offset manner in a tubular nozzle body 14 are a first air guiding element 16 and a second air guiding element 18, which each form a screw shape. As a result, a first air path 24 and a second air path 26 are formed. In this case, they can be arranged about a longitudinal shaft 38. The two air guiding elements 16 and 18 are each in contact with the wall of the tubular nozzle body 14, such that substantially no air can flow between the air guiding elements 16 and 18, respectively, and the wall.

Arranged between the air guiding elements 16 and 18 is a connecting element 30, which, in FIG. 1A, is configured as a common origin surface which branches into the air guiding elements 16 and 18 at the branching point 22. As a result, the first air path 24 is initially closed in the direction of air flow.

Figure 1B:
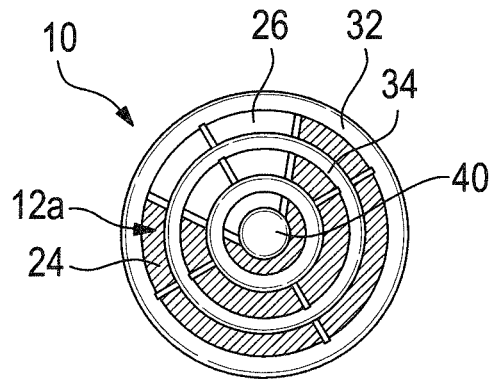
Figure 4A:
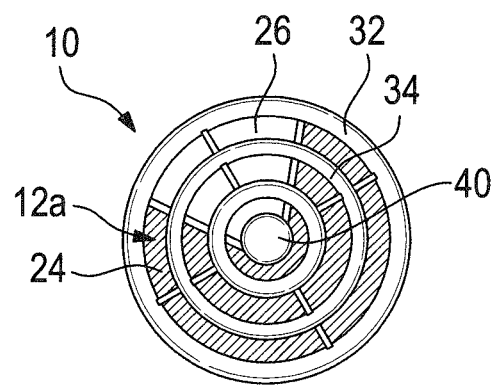
FIGS. 4A-4B show an exemplary embodiment of the air outlet nozzle according to the invention in a side view and in a front view, wherein the first air path is closed and the air stream emerges as a spot via the second air path.
Figure 4B:
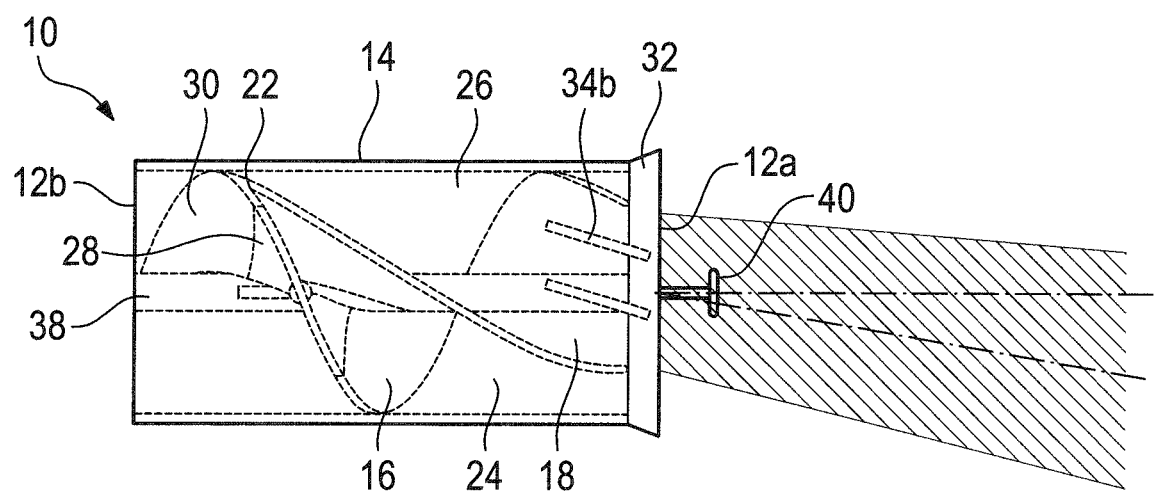

FIG. 1B shows a front view of the air outlet nozzle 10 according to the invention. The cross section of the first air path 24 is in this case illustrated in a hatched manner. As is shown by way of example in FIG. 1B, the cross-sectional area of the first air path 24 is larger than the cross-sectional area of the second air path 26. Accordingly, the volume of the first air path 24 is also greater than the volume of the second air path 20. Since, in FIG. 1B, the first air path 24 is closed, all of the air can only flow out of the air outlet nozzle 10 via the second air path 26. On account of the screw shape of the air guiding elements 16 and 18, this results in a directed and sharp air stream spot with a swirl, which emerges from the air outlet nozzle 10 according to the invention and is illustrated in FIG. 4B.

Also discernible in FIG. 1A is a movable setting element 28, which is arranged downstream of the connecting element 30 with the branching point 22 in the direction of air flow. The movable setting element 28 can be formed for example as a part of the first air guiding element 16. The movable setting element 28 closes, in the first air guiding element 16, in its first position, an opening 20 in the first air guiding element 16. Thus, in a first position of the movable setting element 28, the first air path 24 is closed.

Figure 2A:
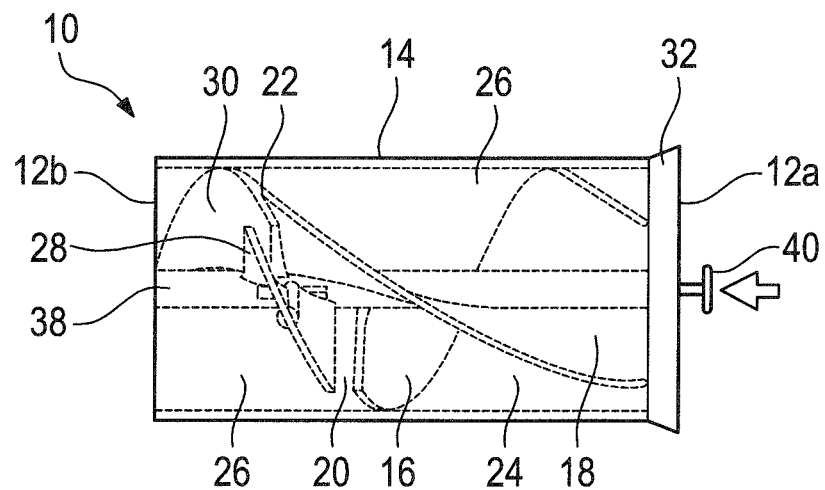
FIGS. 2A-2B show an exemplary embodiment of the air outlet nozzle according to the invention in a side view and in a front view, wherein the first air path is open.
Figure 2B:
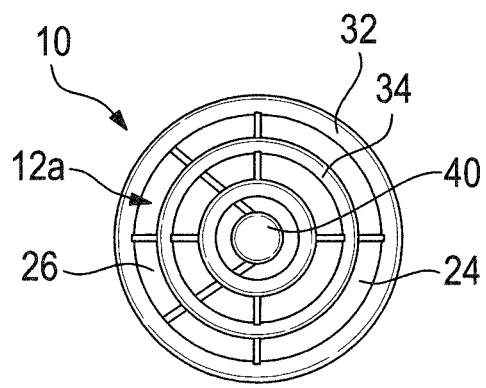
Figure 5A:
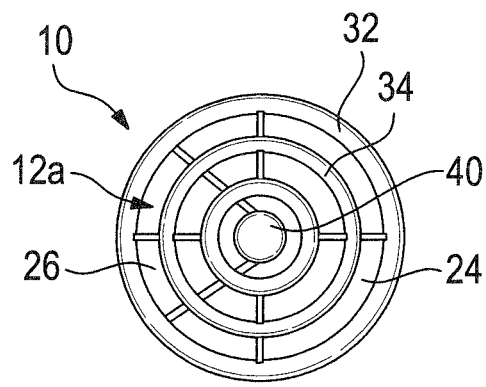
FIGS. 5A-5B show an exemplary embodiment of the air outlet nozzle according to the invention in a side view and in a front view, wherein the first air path is open and the air stream emerges in a diffuse manner via both air paths.
Figure 5B:
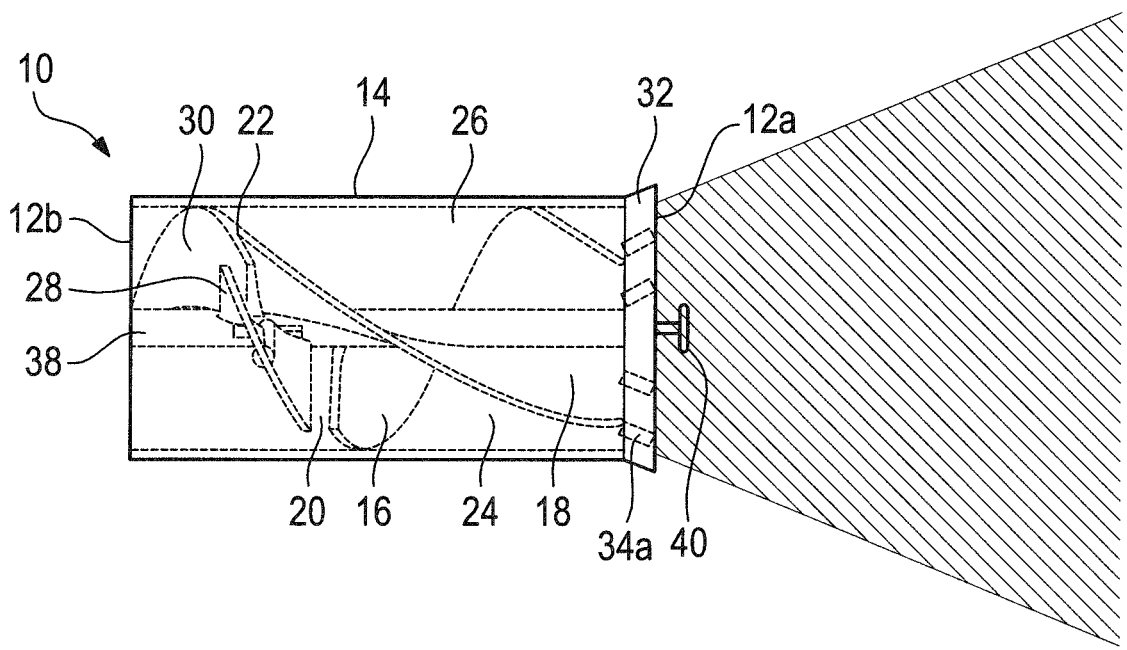

The second position of the movable setting element 28 is illustrated in FIG. 2A. The movable setting element 28 in this case opens the opening 20, with the result that the first air path 24 and the second air path 26 are connected together. Thus, air can flow from the second air path 26 into the first air path 24 and emerge via the entire cross-sectional area of the air outlet opening 12a, this being illustrated in FIG. 2B. This results, in the second position of the movable setting element 28, in a more diffuse or fine air stream, which emerges from the air outlet nozzle 10 according to the invention and is illustrated in FIG. 5B.

Figure 3A:
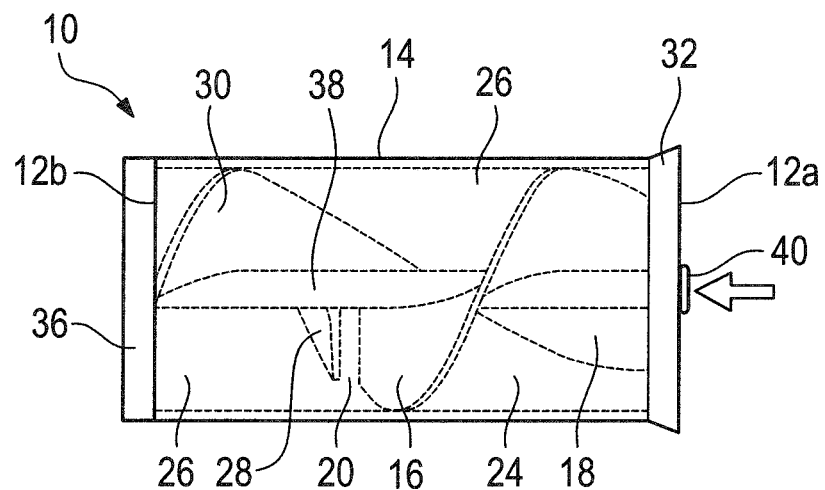
FIGS. 3A-3B show an exemplary embodiment of the air outlet nozzle according to the invention in a side view and in a front view, wherein both air paths are close.
Figure 3B:
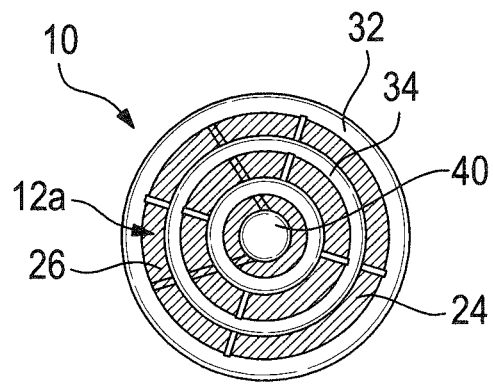

Furthermore, FIG. 3A shows a closure element 36 arranged at the air inlet opening 12b of the tubular nozzle body 14. The closure element 36 closes both air paths 24 and 26 in its first position. As a result, no air can flow out of the air outlet nozzle 10. This is illustrated by the hatched area in FIG. 3B. In the second position of the closure element 36, both air paths 24 and 26 are opened.

The different positions of the movable setting element 28 and of the closure element 36 can be set by a control element 40. According to FIGS. 1A to 3A, the control element 40 is arranged in the longitudinal shaft 38. According to one embodiment, the control element 40 extends beyond the air outlet opening in at least one position. As a result, easy operation of the control of the air outlet nozzle according to the invention is ensured.

In this case, the control element 40 can have different positions: in a first position, the opening 20 is closed by the movable setting element 28 (FIG. 1A). In a second position, the opening 20 is opened by the movable setting element 28 (FIG. 2A). In a third position, it is conceivable for both air paths 24 and 26 to be closed by the closure element 36 (FIG. 3A).

In a further exemplary embodiment, a ring 32, which has slats 34, is arranged at the air outlet opening 12a. The slats 34 are attached to the ring 32 at a previously determined deflection angle.

As can be seen in FIG. 4B, the slats 34b, which guide air out of the second air path 26, have a greater length than the slats 34*a* shown in FIG. 5B, which guide air out of the first air path 24. In this case, the deflection angle of the slats 34*a* and 34*b* can also be different in each case. In this way, the desired air flows can be achieved.

Figure 1C:
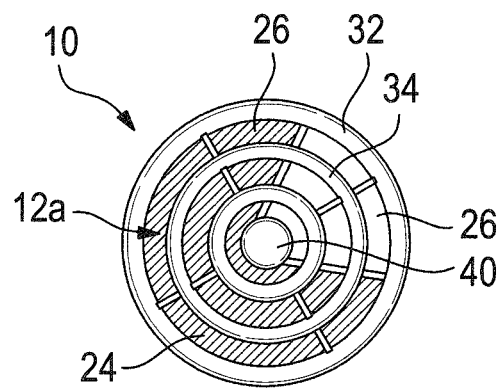

In a further exemplary embodiment, the ring 32 is firmly connected to the nozzle body 14. When air flows out only through the second air path 26 (FIGS. 1A and 4B) and the ring 32 is rotated, the second air path 26 likewise rotates, as is illustrated in FIGS. 1B and 1C. In this case, it is conceivable for the ring 32 to be able to rotate through 360°. As a result of the rotation of the ring, any deflection of the air stream spot through 360° about the previously determined deflection angle of the slats of the air outlet nozzle is then allowed.

Likewise, the ring 32 can be connected to the first air guiding element 16 and the second air guiding element 18, and the latter are mounted in a rotatable manner in the tubular nozzle body 14. In this case, the ring 32 can rotate through 360° with the air guiding elements 16 and 18. As a result of the rotation of the ring, any deflection of the air stream spot through 360° about the previously determined deflection angle of the slats of the air outlet nozzle is then allowed.

Furthermore, it is also generally possible for the air guiding elements 16 and 18 to be formed by symmetrical and asymmetrical screw shapes. As a result, the volumes in the air paths 24 and 26 can be changed in order to achieve different air flows in the first and in the second position of the movable control element 28. For example, the volume in the second air path 26 can be a quarter of the total volume of the nozzle body 14 and the volume in the first air path 24 can be three quarters of the overall volume of the nozzle body 14. Furthermore, the screw-shaped air guiding elements 16 and 18 can have any desired numbers of turns and pitches.

Furthermore, it is also possible for more than two air guiding elements to be used, such that it is not only possible for a theoretically double-threaded screw arrangement, as shown in FIG. 1A, to be formed, but also multi-threaded screw arrangements.

In a further embodiment of the air outlet nozzle according to the invention, a partition wall can be formed between the first air guiding element 16 and the second air guiding element 18, and thus close the first air path 24 (not shown). In this case, the two air guiding elements 16 and 18 do not originate from a common origin surface 30, as in FIG. 1A. For example, in an air outlet nozzle, a partition wall can be formed between the first air guiding element 16 and the second air guiding element 18, the air guiding elements 16 and 18 extending parallel to one another in a similar manner to a double-threaded screw arrangement therein.

In a further advantageous embodiment, this partition wall can be configured as a movable setting element 28 and close the first air path 24 in a first position and open the first air path 24 in a second position (not shown).

In summary, the present invention allows optimal orientation of the air stream out of a fresh air grill, with long guides and few interfering contours being used. Moreover, the present invention allows the number of movable parts of a fresh air grill to be reduced, rattling noises to be minimized, a stable geometry (no flexible slats) and easy operation (for example rotation of the outer ring). The simplified technology and use of few components results in lower costs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air outlet nozzle for a motor vehicle, comprising:
   a tubular nozzle body;
   a first air guiding element arranged in the tubular nozzle body, said first air guiding element being in contact with the tubular nozzle body and forming a screw shape;
   a second air guiding element arranged in the tubular nozzle body, said second air guiding element being in contact with the tubular nozzle body and forming a screw shape;
   wherein the first air guiding element and the second air guiding element are arranged in the tubular nozzle body in a coaxial manner offset from one another, such that a first air path and second air path having different cross-sectional areas are formed in the tubular nozzle body; and
   a movable setting element which closes the first air path in a first position and opens the first air path in a second position, such that the first air path and the second air path are connectable to one another;
   wherein the first and second air guiding elements are connected at a common origin surface with a branching point upstream of the movable setting element, from which the first and second air guiding elements branch in a direction of air flow such that air from the second air path is directed into the first air path when the movable setting element is in the second position.

2. The air outlet nozzle as claimed in claim 1, wherein the tubular nozzle body has, at an air outlet opening, a ring to which slats for deflecting the air flow at a previously determined deflection angle are attached.

3. The air outlet nozzle as claimed in claim 2, wherein a plurality of the slats are arranged in the first air path and a plurality of the
   slats are arranged in the second air path, wherein the slats arranged in the first air path are at a deflection angle which is different than a deflection angle of the slats arranged in the second air path, and/or
   the slats arranged in the first air path have a slat length which is different than the slat length of the slats arranged in the second air path.

4. The air outlet nozzle as claimed in claim 2, wherein the ring is connected to the tubular nozzle body.

5. The air outlet nozzle as claimed in claim 3, wherein the ring is connected to the tubular nozzle body.

6. The air outlet nozzle as claimed in claim 2, wherein the ring is connected to the first air guiding element and to the second air guiding element, and the ring, the first air guiding element and the second air guiding element are mounted in a rotatable manner with regard to the tubular nozzle body.

7. The air outlet nozzle as claimed in claim 3, wherein the ring is connected to the first air guiding element and to the second air guiding element, and the ring, the first air guiding element and the second air guiding element are mounted in a rotatable manner with regard to the tubular nozzle body.

8. The air outlet nozzle as claimed in claim 1, further comprising:
   a closure element arranged at an air inlet opening of the tubular nozzle body, said closure element closing both air paths in a first position and opening both air paths in a second position.

9. The air outlet nozzle as claimed in claim 1, further comprising:
- a longitudinal shaft which is arranged in the tubular nozzle body and to which the first air guiding element and the second air guiding element are attached, wherein the longitudinal shaft has a movable control element, and
- in a first position of the control element, the setting element is in its first position for closing the first air path, and
- in a second position of the control element, the setting element is in its second position for opening the first air path.

10. The air outlet nozzle as claimed in claim 9, wherein in the first and second positions of the control element, a closure element is in a second position of the closure element for opening both air paths, and
- in a third position of the control element, the closure element is in a first position of the closure element for closing both air paths.

11. The air outlet nozzle as claimed in claim 1, further comprising a shaft to which the first air guiding element and the second air guiding element are connected at equal positions along a longitudinal direction of the shaft.

* * * * *